United States Patent [19]

Hall et al.

[11] 4,213,811
[45] Jul. 22, 1980

[54] CONTINUOUSLY ADVANCING MANDREL

[75] Inventors: Marcus A. Hall, Branford, Conn.;
Thomas A. Kutnyak, Greenwood, S.C.

[73] Assignee: Automation Industries, Inc., Greenwich, Conn.

[21] Appl. No.: 903,772

[22] Filed: May 10, 1978

[51] Int. Cl.² .............................................. B65H 8/00
[52] U.S. Cl. .................................. 156/195; 156/429; 156/446
[58] Field of Search ................ 156/195, 425, 428–432, 156/446

[56] References Cited

U.S. PATENT DOCUMENTS

| 2,828,259 | 3/1958 | Fisher | 156/446 X |
| 3,130,104 | 4/1964 | Lewis et al. | 156/195 X |
| 3,155,559 | 11/1964 | Hall | 156/429 X |

Primary Examiner—David A. Simmons
Attorney, Agent, or Firm—Thomas L. Flattery

[57] ABSTRACT

A continuously advancing definite length mandrel device wherein a cylindrical mandrel surface is formed by helically wound closed-loop belt convolutions, improved in that a plurality of belts are employed to form the surface.

12 Claims, 8 Drawing Figures

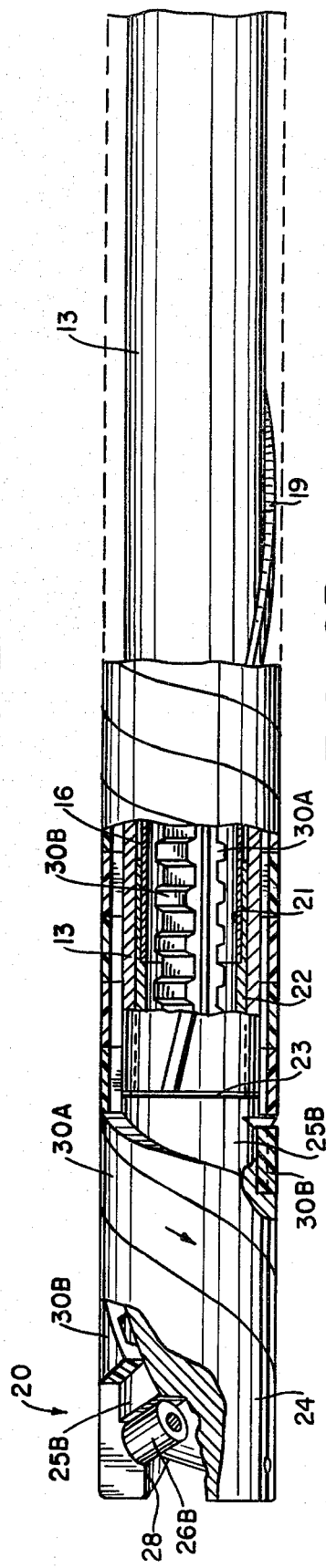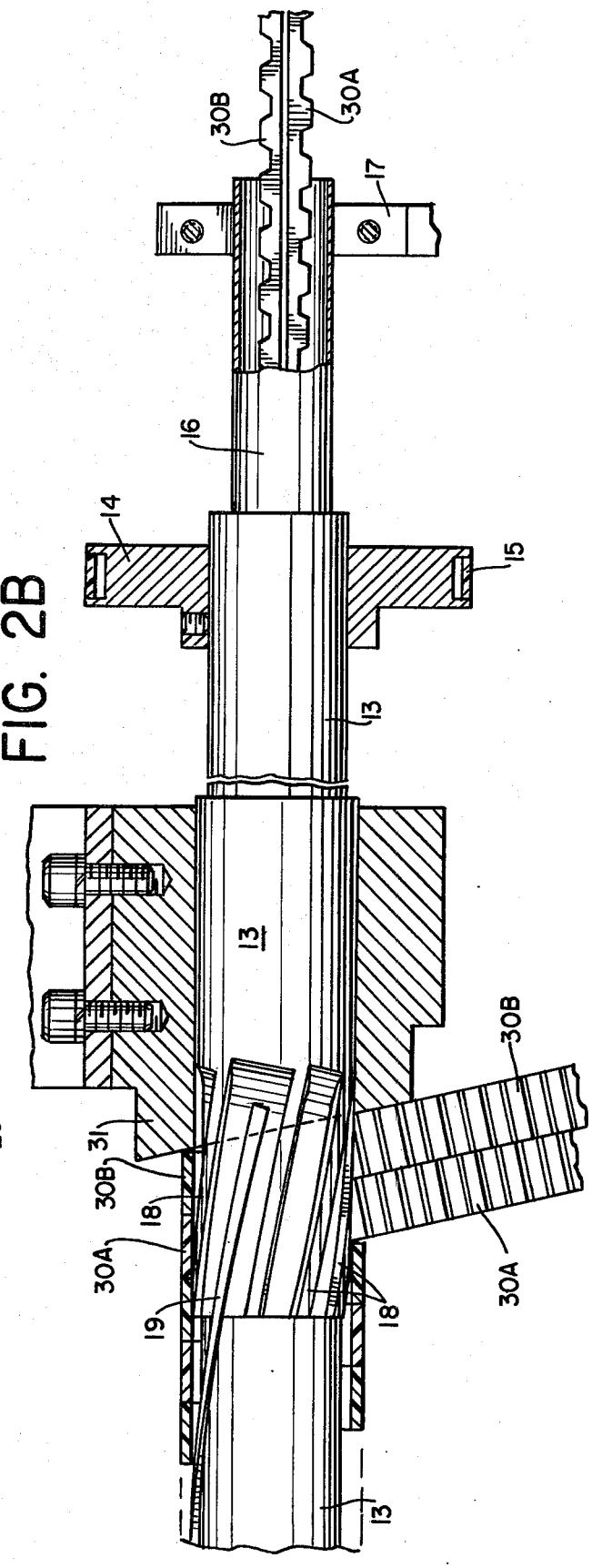

CONTINUOUSLY ADVANCING MANDREL

BACKGROUND OF THE INVENTION

Of the many uses for a continuously advancing mandrel surface, perhaps the most important is in the manufacture of indefinite length helically fabricated tubing. Such a mandrel is wrapped helically with strip or other fabricating elements and upon suitable attachment of the applied convolutions there emerges from the end of the mandrel a progressively advancing finished tube of indefinite length. One early attempt in the design of such a mandrel involved the use of longitudinal closed-loop belts traveling along the surface of a mandrel structure and returning through its interior. U.S. Pat. No. 2,828,239 illustrates such apparatus.

A substantial improvement over longitudinal belt mandrels is described in U.S. Pat. No. 3,155,559 and that patent still represents the most highly developed state of the art upon which the improvement of the present invention has been made. It discloses a continuously-advancing definite-length mandrel comprising a frame and a substantially tubular mandrel core axially rotatable with respect to the frame. A belt is provided with a portion thereof wrapped helically about the core with its convolutions defining a mandrel surface. Drive means are included for rotating the core with respect to the frame and drawing additional convolutions of the belt about one end of the core. Feeding means are included on the frame for urging all of the convolutions toward the opposite end of the core. A belt guide is provided at the opposite end of the core and affixed to the frame for controlling the collapse of each successive belt convolution and directing it inwardly through the core so that it can be wrapped back onto the core.

It was recognized from the outset that the helically fabricated tubing made on such a mandrel would have a helical lead or pitch equal to the lead or pitch of the single belt. Therefore it was suggested in the prior art patent itself that two or more belts could be wrapped around the core and passed around a multiple groove device so that the mandrel surface would advance further at each revolution of the core (see lines 1 to 9 of column 5 of U.S. Pat. No. 3,155,559). It is the purpose of the present invention to carry that suggestion to its optimum conclusion and thus provide a multiple belt mandrel device which is as free as possible of unequal drag and friction on its plurality of belts and which permits the widest possible belts to be used for a given mandrel diameter. The wider the belts in relation to mandrel diameter, the greater will be the lead or pitch of the helically fabricated tubing in relation to its inside diameter, which in turn is an advantage in many designs of tubing.

SUMMARY OF THE INVENTION

This invention relates to improvements in a continuously advancing definite length mandrel device for making indefinite length articles. The device includes a frame and tubular mandrel core axially rotatable with respect to the frame and drive means for rotating the core. The improvement comprises a plurality of closed-loop belts, each having portions wrapped helically about the core in multiple lead fashion with their convolutions defining a mandrel surface. By this construction, as the core is rotated additional convolutions of the belt are drawn onto one end of the core. As in the prior single belt device, feeding means are included on the frame for urging all of the convolutions toward the opposite end of the core and means are associated with the convolutions for maintaining all of them in a sliding fit about the core. An improved belt guide is located at the opposite end of the core, fixed with respect to the frame, which collapses the convolutions inwardly and returns each belt through the inside of the core toward the first mentioned end thereof. The guide is formed with a plurality of grooves for receiving the respective plurality of belts. An important feature of the improvement is that the grooves are of equal length along their centerlines.

In a preferred form of the improved apparatus, two belts are provided and consequently two grooves are formed in the belt guide. Not only are the two grooves of equal length but they are disposed symmetrically on opposite sides of the guide. As each pair of adjoining convolutions of the first and second belts approaches the guide the first belt convolution of the pair enters the first groove a half turn of the core before the second belt convolutions enters the second groove. Each belt travels exactly the same distance around the belt guide and friction in the respective grooves is therefore substantially equal. It is characteristic of this design that a given point on the first or lead belt moves ahead of a corresponding point on the second or following belt with which it had been paired during translation as a mandrel surface. This movement ahead is equal to half the circumference of the mandrel surface.

The invention also includes an improved method of making indefinite length helically fabricated flexible tubing from at least one extended fabricating element. In this method an elongated circumferentially complete mandrel surface is continuously formed, continuously translated in a longitudinal direction, continuously collapsed at the end thereof which is forward in relation to the direction of translation, and continuously replaced at that end thereof which is rearward in relation to the direction of translation. The extended fabricating element is continuously applied adjacent the rearward end of the mandrel surface so that it advances continuously from the forward end of the mandrel surface in the form of the article.

The present improvement in this method comprises forming the circumferentially complete mandrel surface by arranging a pair of flexible closed-loop belts helically in multiple lead fashion with their alternating convolutions adjoining and defining the mandrel surface, with the first belt leading and the second belt following in the alternating convolutions and with a hollow space defined axially within the convolutions. The method provides for collapsing the mandrel surface by directing the first belt convolutions off the mandrel surface at the forward end thereof prior to directing the second belt convolutions off the mandrel surface at the forward end thereof. The belts are returned in paths of equal length from the mandrel surface rearwardly into the hollow space.

Other objectives and advantages of the invention will become apparent in the following description taken in conjunction with the accompanying drawings.

BRIEF DESCRIPTION OF THE DRAWINGS

FIG. 2A is an enlarged elevation, partly broken away and in section, of the outer end portion of the mandrel;

FIG. 2B is a continuation of FIG. 2A showing the inner end portion of the mandrel and associated frame;

DESCRIPTION OF PREFERRED EMBODIMENT

Figure 1:
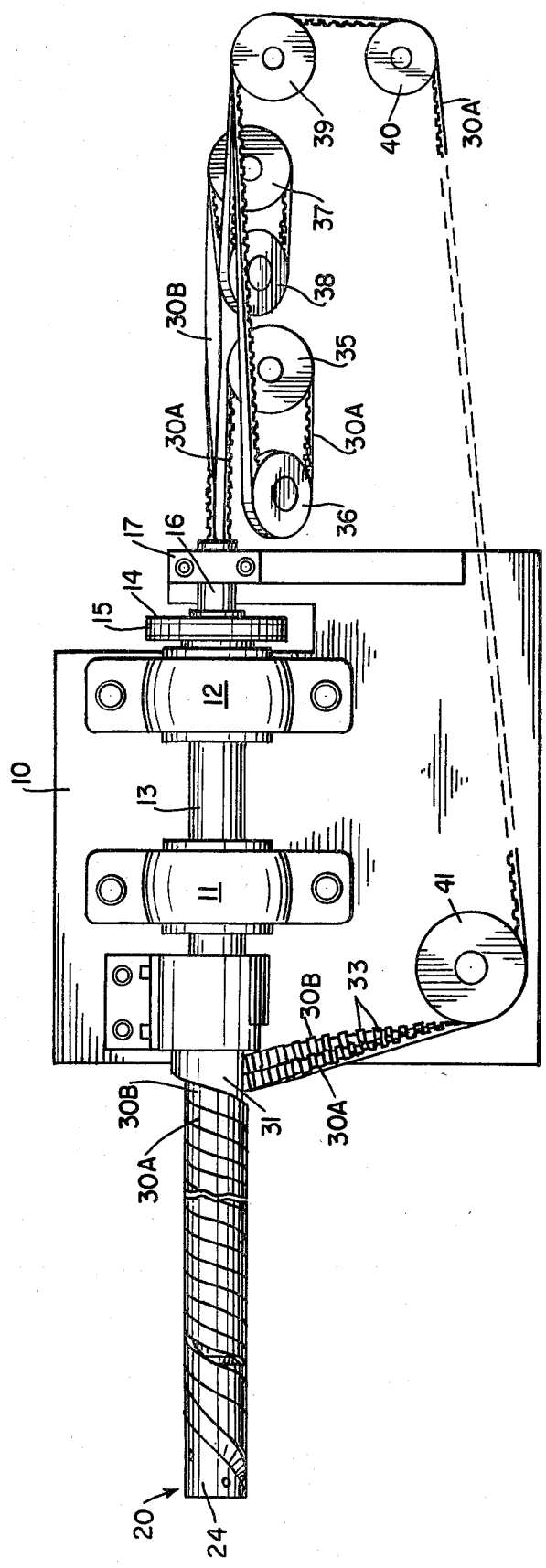
FIG. 1 is an elevation, partly broken away, of a double-belt form of the improved mandrel device.

The mandrel apparatus of the invention includes a stationary frame 10 on which are mounted a pair of aligned bearings 11 and 12. An elongated tubular mandrel core 13 is rotatably supported in these bearings and has a drive pulley 14 mounted at one end. The drive pulley 14 is driven by a drive belt 15 which in turn is driven by a suitable electric motor, not shown, which is the primary source of the drive system. Located concentrically within the core 13 and extending through its length is a support tube 16 which is fixed at one end to the frame 10 by a mount 17. When the pulley 14 is driven the mandrel core 13 rotates axially in the bearings 11 and 12 about the support tube 16.

Figure 4:
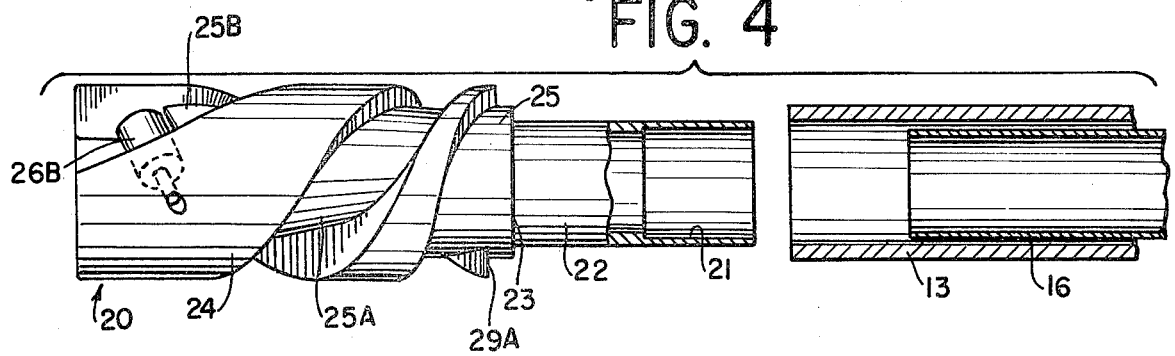
FIG. 4 is an exploded view, partly in section, showing the structure of the outer end of the mandrel without the belts.

A plurality of drive teeth 18 are formed about the core 13 adjacent the frame 10. On the surface of the core is a long helically disposed key 19 extending from one of the teeth 18 to the opposite end of the core. A guide device 20 is attached to the end of the supporting tube 16. In FIG. 4 it will be seen that a socket 21 is formed in the end of a base 22 of the guide 20 and receives the end of the support tube 16. The end of the tube 16 is fixed in place in the socket 21 by a firm press fit or by welding. When the two parts are assembled the outer end of the tubular core 13 abuts a shoulder 23 on the guide 20.

Figure 5:
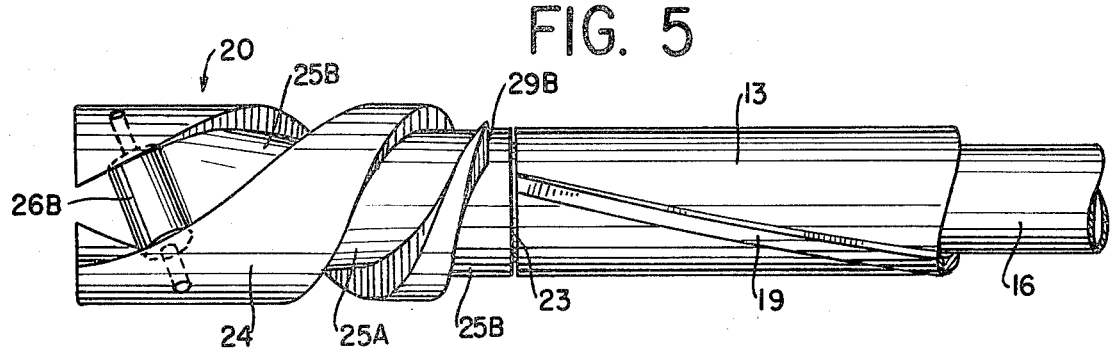
FIG. 5 is an elevation of one side of the belt guide without the belts.
Figure 6:
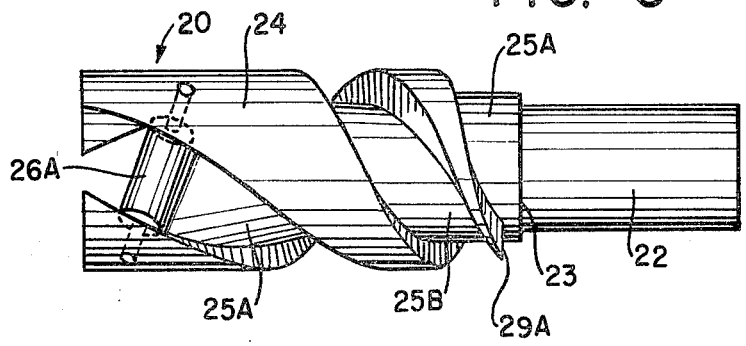
FIG. 6 is an elevation of the other side of the belt guide.

From the shoulder 23 of the guide 20 to its outermost end the guide consists of a body 24 in which two grooves 25A and 25B are formed. In FIG. 5 the beginning of the first groove 25A can be seen near the shoulder 23 and its outer end appears near the outer end of the body 24. A middle section of the other groove 25B is also visible in FIG. 5. In FIG. 6 the beginning of the groove 25B and its outer end are visible, as is the middle portion of the other groove 25A. Each groove is of the same regular cross section with a width greater than its depth and having a generally helical configuration with its lead or pitch increasing as the outer end of the guide 20 is approached. Each groove is of the same length along its centerline and they are disposed symmetrically on opposite sides of the guide.

Figure 3:
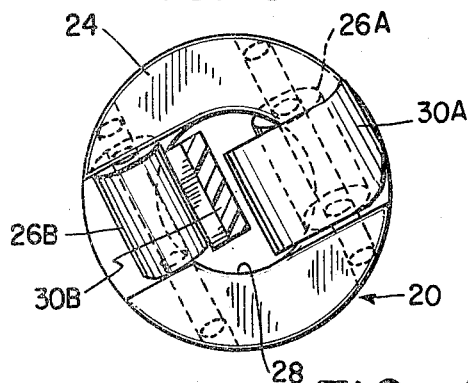
FIG. 3 is an end view of the outer end of the mandrel with one of the two belts in section.

A roller 26A is located at the outer end of the groove 25A and a roller 26B is located at the outer end of the groove 25B. As shown in FIG. 3 the guide 20 is hollow and has an inner bore 28 extending through its length.

It is important that the grooves 25A and 25B are of equal length along their centerlines. It is also preferred that the groove 25A begin exactly one hundred and eighty degrees around the surface of the guide 20 from the groove 25B. The groove 25A thus begins with an upstanding edge 29A in the body 24 of the guide, and the groove 25B begins with an upstanding edge 29B in the body 24 of the guide.

Referring particularly to FIGS. 1 to 3, the apparatus includes a pair of closed-loop belts 30A and 30B. The belt 30A can be referred to as the first or forward belt and the belt 30B can be referred to as the second or rearward belt. Each has the same cross-sectional configuration which in turn is the same as the cross-sectional configuration of the grooves 25A and 25B. They are wrapped around the mandrel core 13 at a feed cam 31 which has a planar working surface facing the opposite end of the core at an angle ninety degrees less than the helix angle of the key 19. The feed cam 31 always engages the second or rearward belt 30B, the first or forward belt 30A always being spaced away from the cam by the belt 30B. Lateral gripping teeth 33 are formed on the underside of each of the belts 30A and 30B and are registerable with the drive teeth 18 and the key 19. Since the drive teeth 18 are somewhat longer than the combined width of the belts, the belts are positively gripped by the rotating core 13 at the drive teeth 18. It is the function of the key 19 to maintain the belt convolutions of a uniform diameter so that they slide easily along the surface of the core 13.

With every turn of the core 13 additional paired convolutions of the belts 30A and 30B are wrapped about the core and are urged forwardly by the cam 31. The convolutions adjoin one another side-by-side and thus form a circumferentially complete mandrel surface. When the convolutions reach the outer end of the mandrel they enter the grooves in the guide 20. The first convolution to do so is that on the first or forward belt 30A. It is separated from the adjoining convolution of the belt 30B by the edge 29A and enters the groove 25A. A half turn later of the core 13 the convolution on the second or rearward belt 30B is separated from the following convolution of the first belt 30A by the edge 29B and enters the groove 25B. The belt 30A then passes around the roller 26A and back into the interior of the guide 20 through the bore 28. The belt 30B travels in a similar manner around the roller 26B and back into the bore 28. Inside the core 20 and throughout the return path the two belts are face-to-face with their teeth directed outwardly as seen in FIG. 3.

When the belts emerge at the inner end of the supporting member as shown in FIG. 1, belt 30A is directed around pulleys 35 and 36 while the belt 30B is directed around the pulleys 37 and 38. They are brought back together side-by-side with their teeth facing inwardly at a double pulley 39 then around a second double pulley 40 and another double pulley 41, from which they are directed back around the core 13 adjacent the cam 31.

It is clear in this design that adjoining convolutions of the belts 30A and 30B are stationary with respect to one another as they move the length of the mandrel and approach the guide 20. If two points A and B (see FIG. 7) on adjoining pairs of convolutions of the belts 30A and 30B were to be followed to the outer end of the mandrel, it would be seen that point A on the belt 30A enters the groove 25A while point B on the belt 30B has not yet reached its groove 25B. A half turn of the core later, however, point B on the belt 30B also enters its groove 25B, but by that time point A on the belt 30A is well on its way along its groove 25A. When the two belts come together inside the guide 20 after passing around the respective rollers 26A and 26B, point A on the belt 30A has outdistanced point B on the belt 30B by half the circumference of the mandrel.

Since the length of the grooves 25A and 25B are equal it will be understood that the first or forward belt 30A advances forwardly in relation to the second or rearward belt 30B a distance equal to half the circumference of the mandrel surface every time point A and point B make a full cycle around their entire path. The design of the mandrel and its guide 20 is in all respects symmetrical by this arrangement and the drag or friction on the two points is substantially identical. This would not be the case if the grooves 25A and 25B were of unequal length or if they did not have the same configuration about the guide 20.

Figure 7:
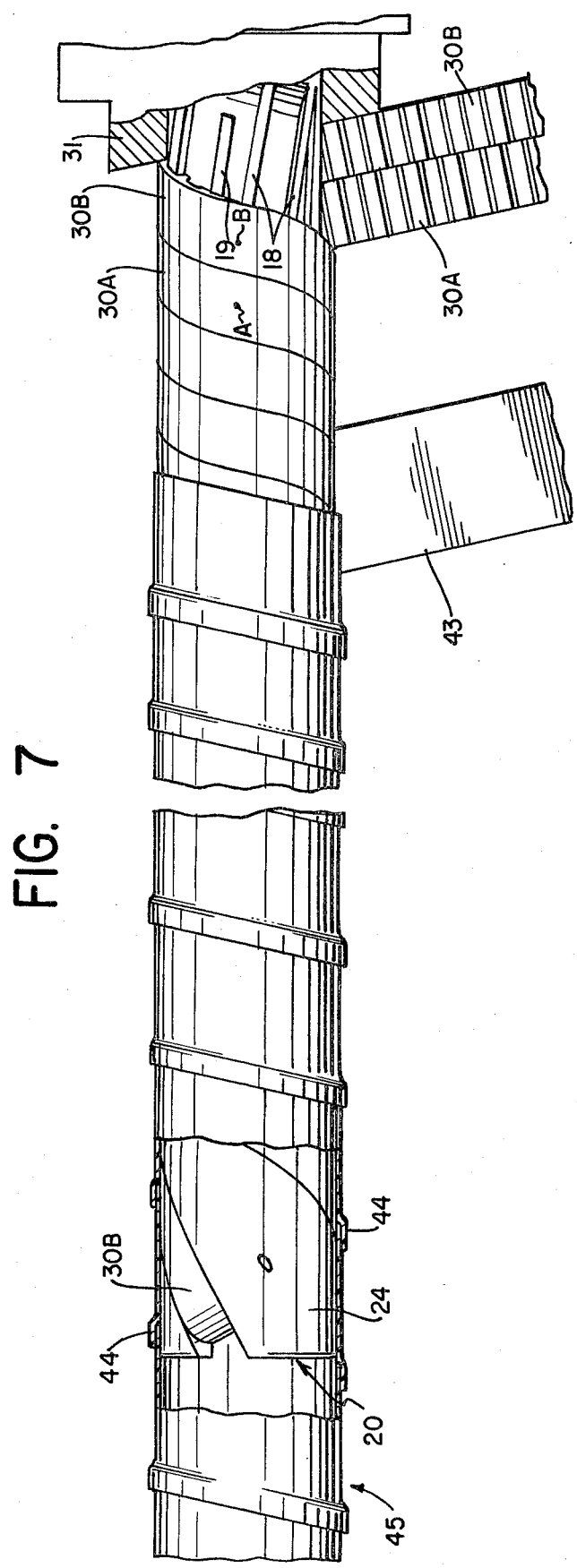
FIG. 7 is a schematic illustration showing the formation of a helically fabricated tube on the double-belt mandrel of the invention.

In FIG. 7 the formation of a simple design of tubing is shown for purposes of illustrating the function of the double belt mandrel of the invention. A strip 43 of flexible material such as plastic is applied about the mandrel surface formed by the belts 30A and 30B just forwardly of the cam 31. The width of the strip 43 is slightly greater than twice the width of each of the belts. With every turn of the mandrel the strip 43 is drawn helically about the mandrel with a slight overlap 44 of its forward edge over the rearward edge of the preceeding turn of the strip. These overlapping edges may be secured by adhesive or other suitable means.

As more turns of the strip 43 are applied they move forwardly along the mandrel with a helical lead or pitch equal to twice the width of one of the belts 30A or 30B. In this manner there emerges from the end a tube 45 having an inside diameter equal to the diameter of the belt convolutions on the mandrel and having a helical form of twice the lead or pitch which could have been made on the single belt mandrel device of the prior art.

I claim:

1. In a continuously advancing definite length mandrel device for making indefinite length articles, including a frame and a tubular mandrel core axially rotatable with respect to the frame and drive means for rotating the core, the improvement which comprises
    (a) a plurality of closed-loop belts each having portions wrapped helically about said core in multiple lead fashion with their convolutions defining a mandrel surface, whereby as the core is rotated additional convolutions of said belts are drawn onto one end of said core;
    (b) feeding means on said frame for urging all of said convolutions toward the opposite end of said core;
    (c) means associated with said belt convolutions for maintaining all of said convolutions in a sliding fit about said core; and
    (d) a belt guide at said opposite end of said core fixed with respect to the frame for collapsing the successive convolutions inwardly and returning each belt facing one another side-by-side through the inside of the core toward the first mentioned end thereof, said guide being formed with a plurality of grooves for receiving the respective plurality of belts, said grooves being of equal length along their centerlines.

2. Apparatus according to claim 1 wherein respective rollers are located in the plurality of grooves in the belt guide at the outermost end of said grooves where the respective belts are directed around the outer end of the guide and rearwardly back into the interior of the mandrel core.

3. Apparatus according to claim 1 wherein each of said grooves has a cross-sectional configuration conforming substantially to the cross-sectional configuration of its respective belt.

4. In a continuously advancing definite length mandrel device for making indefinite length tubing, including a frame and a tubular mandrel core axially rotatable with respect to the frame and drive means for rotating the core, the improvement which comprises
    (a) first and second closed-loop belts each having portions wrapped helically about said core in double lead fashion with their alternating convolutions adjoining and defining a mandrel surface, the first belt leading and the second belt following in the alternating convolutions, whereby as the core is rotated additional convolutions of the belts are drawn side-by-side onto one end of said core;
    (b) feeding means on said frame for urging all of said convolutions toward the opposite end of said core;
    (c) means associated with said belt convolutions for maintaining all of said convolutions in a sliding fit about said core; and
    (d) a belt guide at said opposite end of said core fixed with respect to the frame for collapsing the successive convolutions inwardly and returning both belts facing one another side-by-side through the inside of the core toward the first mentioned end thereof, said guide being formed with first and second grooves for receiving the respective first and second belts, said grooves being of equal length along their centerlines and disposed symmetrically on opposite sides of the guide, whereby as each pair of adjoining convolutions of the first and second belts approaches the guide the first belt convolution of the pair enters the first groove a half turn of the core before the second belt convolution enters the second groove.

5. Apparatus according to claim 4 wherein said feeding means comprises a feeding cam engageable with successive convolutions of the second belt when the belts are initially drawn side-by-side about said core, said cam including a planar working surface facing said opposite end of said core at an angle with respect to the core axis equal to the helix angle of the helically applied belt convolution.

6. Apparatus according to claim 4 wherein respective rollers are located in the grooves where the respective belts are directed around the outer end of the guide and rearwardly back into the interior of the mandrel core.

7. Apparatus according to claim 4 wherein each of said belts and grooves has substantially the same cross-sectional configuration.

8. Apparatus according to claim 4 werein the drive means includes drive teeth encircling the core adjacent the feeding means, said drive teeth having a length at least as great as the combined width of the belts, and said belts include a multiplicity of gripping teeth along their inside surface registerable with the drive teeth, whereby the drive teeth draw the side-by-side belts together about the core when the core is rotated.

9. Apparatus according to claim 8 wherein the means for maintaining the belt convolutions in a sliding fit about said cam comprises a key extending the length of the outer surface of the core from one of said drive teeth, said key being registerable with the gripping teeth on said belts and being disposed helically along said core at a helix angle ninety degrees greater than that of said belt convolutions.

10. Apparatus according to claim 4 wherein said belt withdrawal means includes pulleys rotatable on said frame for directing said belts through the inside of said core.

11. In a continuous method of making indefinite length helically fabricated flexible tubing from at least one extended fabricating element wherein an elongated circumferentially complete mandrel surface is continuously formed, continuously translated in a longitudinal direction and rotated, continuously collapsed at the end thereof which is forward in relation to the direction of translation, and continuously replaced at that end thereof which is rearward in relation to said direction of translation, and the extended fabricating element is continuously applied adjacent the rearward end of the mandrel surface so that it advances continuously from the forward end of the mandrel surface in the form of said article, the improvement which comprises (a) forming said circumferentially complete mandrel surface by arranging a pair of flexible closed-loop belts helically in multiple lead fashion with their alternating convolutions adjoining and defining the mandrel surface, with the first belt leading and the second belt following in the alternating convolutions, and with a hollow space defined axially within said convolutions, (b) collapsing said mandrel surface by directing the first belt convolutions off the mandrel surface at the forward end thereof prior to directing the second belt convolutions off the mandrel surface at the forward end thereof, and (c) returning the belts in paths of equal length from the mandrel surface rearwardly into said hollow space.

12. The method according to claim 11 wherein the first belt convolutions are directed off the mandrel surface a half turn of the mandrel surface prior to directing the second belt convolutions off the mandrel surface.

* * * * *